United States Patent
Hoshi et al.

(10) Patent No.: US 8,000,886 B2
(45) Date of Patent: Aug. 16, 2011

(54) CONTROL DEVICE FOR INTERNAL COMBUSTION ENGINE

(75) Inventors: Koichi Hoshi, Susono (JP); Shogo Suda, Toyota (JP); Makoto Tomimatsu, Susono (JP); Yoshihiko Suzuki, Gotenba (JP); Makoto Fukumoto, Numazu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 158 days.

(21) Appl. No.: 12/530,292

(22) PCT Filed: Mar. 6, 2008

(86) PCT No.: PCT/JP2008/054556
§ 371 (c)(1),
(2), (4) Date: Sep. 8, 2009

(87) PCT Pub. No.: WO2008/108502
PCT Pub. Date: Sep. 12, 2008

(65) Prior Publication Data
US 2010/0059029 A1 Mar. 11, 2010

(30) Foreign Application Priority Data
Mar. 7, 2007 (JP) .................................. 2007-057792

(51) Int. Cl.
*F01L 1/34* (2006.01)
(52) U.S. Cl. ................. 701/113; 123/703; 123/142.5 E; 123/90.15
(58) Field of Classification Search .................. 701/113; 123/90.15–90.18, 142.5 E, 703
See application file for complete search history.

(56) References Cited

U.S. PATENT DOCUMENTS

| 5,850,811 | A | 12/1998 | Tomisawa et al. |
| 6,772,720 | B2 | 8/2004 | Yoshihiro |
| 2008/0209900 | A1 | 9/2008 | Demura et al. |
| 2010/0032023 | A1* | 2/2010 | Fujimoto ........................ 137/59 |

FOREIGN PATENT DOCUMENTS

| JP | 10 68332 | 3/1998 |
| JP | 2002 227630 | 8/2002 |
| JP | 2004 197724 | 7/2004 |
| JP | 2004 353495 | 12/2004 |
| JP | 2005 105960 | 4/2005 |
| JP | 2007 32544 | 2/2007 |

* cited by examiner

*Primary Examiner* — Erick Solis
(74) *Attorney, Agent, or Firm* — Oblon, Spivak, McClelland, Maier & Neustadt, L.L.P.

(57) ABSTRACT

An internal combustion engine, including an air/fuel ratio sensor in an exhaust passage detecting an air/fuel ratio in a heated state, implements a technique improving emission at a starting time, by eliminating splash of water droplets early in the exhaust passage at the starting time to advance the heating starting timing of the air/fuel ratio sensor. At the starting time, opening/closing timing of a valve is advanced from a reference opening/closing timing or the reference of the opening/closing timing of the exhaust valve after the warming-up was ended, which continues until the wall temperature of the exhaust passage near the air/fuel ratio sensor becomes equal to or higher than a water droplet disappearing temperature, at which water droplets disappear. Then, change of the opening/closing timing of the exhaust valve responding to the running state by a variable valve mechanism is started.

4 Claims, 6 Drawing Sheets

CONTROL DEVICE FOR INTERNAL COMBUSTION ENGINE

CROSS-REFERENCE TO RELATED APPLICATIONS

The present application is the U.S. National Stage of application PCT/JP2008/054556 filed on Mar. 6, 2008, and claims priority to Japanese Patent Application No. JP 2007-057792 filed on Mar. 7, 2007, the entire contents of each of which are hereby incorporated herein by reference.

TECHNICAL FIELD

The present invention relates to a control device for an internal combustion engine, and more particularly to a device for controlling an opening/closing timing of an exhaust valve during start-up of the internal combustion engine.

BACKGROUND ART

In some internal combustion engines, an air/fuel ratio sensor (for example, an oxygen concentration sensor) is arranged in an exhaust passage, and air/fuel ratio feedback control is performed by having the air/fuel ratio sensor detect exhaust gas components (for example, oxygen concentration).

In this case, a sensor element provided in the air/fuel ratio sensor is typically activated when heated to at least a predetermined temperature, thereby becoming capable of detecting the exhaust gas components. Accordingly, a sensor heater for heating the sensor element is often disposed in the air/fuel ratio sensor.

In an internal combustion engine having an air/fuel ratio sensor such as that described above, moisture generated during combustion is contained in the exhaust gas that is discharged from the internal combustion engine at the time of start-up, and in certain cases, this moisture forms water droplets that come into contact with the air/fuel ratio sensor. Further, condensed water is generated when exhaust gas remaining in the exhaust passage is cooled following a previous engine stoppage, and this condensed water may spatter onto the air/fuel ratio sensor when the internal combustion engine is started.

Hence, a part of the sensor element, which reaches a high temperature after being heated by the sensor heater, is cooled rapidly upon contact with the water droplets, leading to thermal shock, and as a result, damage such as breakage of the element may occur.

In actuality, however, control is often performed to restrict energization of the sensor heater until the temperature of the exhaust passage in the vicinity of the air/fuel ratio sensor has risen sufficiently. According to a known technique described in Japanese Patent Application Publication No. JP-A-2005-105960, for example, a set temperature for starting an operation of a heater is modified to a high side when an outside air temperature at the time of engine start-up is lower than an outside air temperature threshold, and the set temperature is set even higher when a temperature difference between an engine cooling water temperature and the outside air temperature at the time of engine start-up is larger than a temperature difference threshold.

Further, as described in Japanese Patent Application Publication No. JP-A-2004-353495, for example, a technique in which an increase rate of a throttle opening is restricted when it is determined that an air/fuel ratio sensor may be spattered by water has been proposed. In this technique, an exhaust gas velocity is not increased rapidly, and therefore a margin for evaporation can be provided before moisture in the exhaust passage spatters. Further, there is no limit on increments in an intake air amount, and therefore acceleration can be achieved through an acceleration operation. However, in these conventional techniques, the start of air/fuel ratio feedback control may be delayed, leading to an increase in emissions during start-up of the internal combustion engine.

Meanwhile, in another known technique, as described in Japanese Patent Application Publication No. JP-A-2002-227630, for example, the opening/closing timing of an exhaust valve is advanced during start-up of an internal combustion engine, thereby raising an internal cylinder pressure when an intake valve is opened, and as a result, compressed gas spit-back to the intake system is promoted, enabling atomization of the injected fuel and combustion stabilization during a cold start. In this case, a further effect is achieved in that gas which has reached a comparatively high temperature during or immediately after combustion in the internal combustion engine is discharged as exhaust gas, leading to an increase in the exhaust gas temperature. This effect may be employed to raise the temperature of the exhaust passage in the vicinity of the air/fuel ratio sensor early. In this conventional technique, however, control to modify the opening/closing timing of the exhaust valve to a timing corresponding to the operating condition is often begun by a variable valve timing mechanism when the cooling water temperature of the internal combustion engine reaches a predetermined value. Hence, the control for advancing the opening/closing timing of the exhaust valve is terminated early, making it difficult to increase the temperature of the exhaust passage efficiently.

An object of the present invention is to provide a technique for use in an internal combustion engine having an air/fuel ratio sensor that is disposed in an exhaust passage and can detect an air/fuel ratio in a heated state, with which the spattering of water droplets in the exhaust passage at the time of start-up can be terminated early, thereby advancing the heating timing of the air/fuel ratio sensor such that emissions during start-up of the internal combustion engine can be improved.

DISCLOSURE OF THE INVENTION

A main feature of the present invention for achieving the object described above is as follows. Specifically, an opening/closing timing of an exhaust valve during start-up of an internal combustion engine is set at a start-up opening/closing timing that is on an advanced side of a reference opening/closing timing serving as a reference of the opening/closing timing of the exhaust valve following warm-up completion. This state is then maintained until a temperature of an exhaust passage in the vicinity of an air/fuel ratio sensor reaches or exceeds a water droplet disappearing temperature at which water droplets disappear. Modification of the opening/closing timing of the exhaust valve corresponding to an operating condition is then begun by a variable valve timing mechanism.

More specifically, a control device for an internal combustion engine includes:

an air/fuel ratio sensor that is provided in an exhaust passage of the internal combustion engine and can detect an air/fuel ratio of an exhaust gas when activated by being heated;

start-up advancing unit for setting an opening/closing timing of an exhaust valve during start-up of the internal combustion engine at a start-up opening/closing timing that is on an advanced side of a reference opening/closing timing serving as a reference of the opening/closing timing of the exhaust valve following warm-up completion;

a variable valve timing mechanism that can modify the opening/closing timing of the exhaust valve;

operating condition corresponding control means for performing operating condition corresponding control in which the variable valve timing mechanism is caused to modify the opening/closing timing of the exhaust valve in accordance with an operating condition of the internal combustion engine; and operating condition corresponding control unit for performing operating condition corresponding control in which the variable valve timing mechanism is caused to modify the opening/closing timing of the exhaust valve in accordance with an operating condition of the internal combustion engine; and temperature obtaining unit for obtaining a temperature of the exhaust passage in the vicinity of the air/fuel ratio sensor, wherein, when the temperature in the vicinity of the air/fuel ratio sensor obtained by the temperature obtaining unit during start-up of the internal combustion engine is lower than a water droplet disappearing temperature at which water droplets in the exhaust passage disappear, the opening/closing timing of the exhaust valve is held at the start-up opening/closing timing, and when the temperature in the vicinity of the air/fuel ratio sensor reaches or exceeds the water droplet disappearing temperature, the operating condition corresponding control unit begins the operating condition corresponding control.

According to this constitution, during start-up of the internal combustion engine, the state in which the opening/closing timing of the exhaust valve is advanced beyond the reference opening/closing timing is maintained until the temperature of the exhaust passage in the vicinity of the air/fuel ratio sensor reaches or exceeds the water droplet disappearing temperature. Hence, a state in which the temperature of the exhaust gas is comparatively high due to the discharge of high-temperature exhaust gas immediately after combustion can be maintained until the temperature in the vicinity of the air/fuel ratio sensor reaches or exceeds the water droplet disappearing temperature. Accordingly, the time required for the temperature in the vicinity of the air/fuel ratio sensor to reach or exceed the water droplet disappearing temperature can be shortened.

As a result, the start timing of air/fuel ratio feedback control by the air/fuel ratio sensor can be advanced, enabling an improvement in emissions during start-up of the internal combustion engine.

Further, in the present invention, the start-up advancing unit may set an opening/closing timing of an intake valve during start-up of the internal combustion engine at an intake side start-up opening/closing timing that is on an advanced side of an intake side reference opening/closing timing serving as a reference of the opening/closing timing of the intake valve following warm-up completion, the variable valve timing mechanism may be made capable of modifying the opening/closing timing of the exhaust valve and the intake valve;

the operating condition corresponding control unit may cause the variable valve timing mechanism to modify the opening/closing timing of the exhaust valve and the intake valve in accordance with an operating condition of the internal combustion engine during the operating condition corresponding control, and when the temperature in the vicinity of the air/fuel ratio sensor, which is obtained by the temperature obtaining unit during start-up of the internal combustion engine, is lower than the water droplet disappearing temperature, the opening/closing timing of the exhaust valve may be held at the start-up opening/closing timing and the opening/closing timing of the intake valve may be held at the intake side start-up opening/closing timing.

Thus, in an internal combustion engine such as the atomization of injected fuel can be achieved by advancing the opening/closing timings of the intake valve and the exhaust valve beyond post-warm-up reference values during start-up of the internal combustion engine, and the opening/closing timings of the intake valve and the exhaust valve are optimized in accordance with the operating condition, the time required for the temperature of the exhaust passage in the vicinity of the air/fuel ratio sensor to reach or exceed the water droplet disappearing temperature can be shortened. As a result, the start timing of air/fuel ratio feedback control by the air/fuel ratio sensor can be advanced, enabling an improvement in emissions during start-up of the internal combustion engine.

Note that the problem solving means of the present invention may be used in combination wherever possible.

BEST MODES FOR CARRYING OUT THE INVENTION

Example embodiments of the present invention will be described in detail below with reference to the drawings.

First Embodiment

Figure 1:
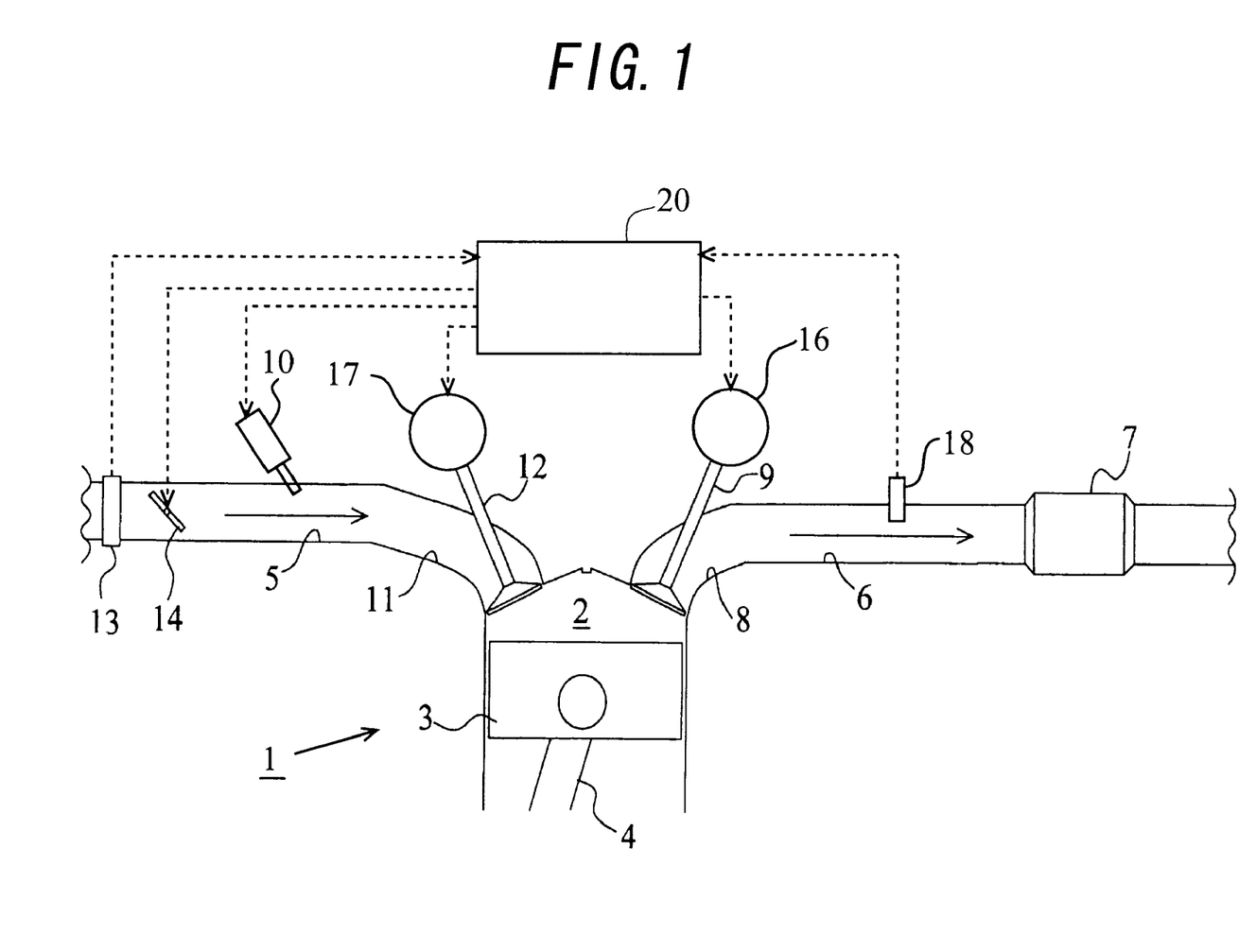
FIG. 1 is a view showing the schematic constitution of an internal combustion engine according to an embodiment of the present invention, as well as an intake/exhaust system and a control system thereof.

FIG. 1 is a view showing the schematic constitution of an internal combustion engine 1 according to this embodiment, as well as an intake/exhaust system and a control system thereof. The internal combustion engine 1 shown in FIG. 1 obtains output by repeating four cycles constituted by an intake stroke, a compression stroke, an explosion stroke (expansion stroke), and an exhaust stroke. A cylinder 2 is formed in the interior of the internal combustion engine 1. A fuel explosion force generated in the cylinder 2 is converted into a rotary force of a crankshaft (not shown) via a piston 3 and a connecting rod 4. Further, an intake port 11 forming a furthest downstream portion of an intake passage 5 and an exhaust port 8 forming a furthest upstream portion of an exhaust passage 6 are connected to the cylinder 2. The intake port 11 is provided with a fuel injection valve 10 that injects fuel for combustion. A boundary between the intake port 11 and the cylinder 2 is opened and closed by an intake valve 12. A boundary between the exhaust port 8 and the cylinder 2 is opened and closed by an exhaust valve 9.

An intake side variable valve timing mechanism (intake side VVT hereafter) 17 and an exhaust side variable valve timing mechanism (exhaust side VVT hereafter) 16 are annexed to the intake valve 12 and the exhaust valve 9, respectively. The intake side VVT 17 and the exhaust side VVT 16 are capable of modifying respective phase angles of the intake valve 12 and the exhaust valve 9 within a predetermined range in accordance with a command from an electronic control unit (ECU) 20. According to this constitution, by appropriately adjusting the opening phase of at least one of the intake valve 12 and the exhaust valve 9, improvements in driving performance and fuel efficiency corresponding to the operating condition can be achieved.

The exhaust passage 6 is further provided with an exhaust gas purification catalyst 7 for purifying exhaust gas, and an air/fuel ratio sensor 18 for detecting the air/fuel ratio of the exhaust gas that passes through the exhaust passage 6 and subjecting the air/fuel ratio to feedback control.

A sensor element (not shown) of the air/fuel ratio sensor 18 is formed from a zirconia tube or the like and activated so as to become capable of detecting an oxygen concentration of the exhaust gas by being heated to at least 400° C., for example.

Further, a sensor heater (not shown) is provided in the interior of the sensor element. The sensor heater is energized in accordance with a command from the ECU 20 before the air/fuel ratio of the exhaust gas is detected and feedback control of the air/fuel ratio sensor is begun, and thus the sensor element is heated.

Meanwhile, a throttle valve 14 that is capable of controlling an intake air amount is provided in the intake passage 5. The intake passage 5 is further provided with an air flow meter 13 for detecting the amount of introduced intake air.

The internal combustion engine 1 includes various other sensors, such as a crank position sensor and an accelerator position sensor (not shown), in addition to the air/fuel ratio sensor 18 and the air flow meter 13. Signals from these sensors are input into the ECU 20.

The ECU 20 includes a logical operation circuit constituted by a central processing unit (CPU), read-only memory (ROM), random access memory (RAM), backup RAM, and so on, and performs overall control of the various constitutional elements of the internal combustion engine 1, including the fuel injection valve 10, the intake side VVT 17, the exhaust side VVT 16, and the throttle valve 14, on the basis of the signals from the various sensors.

Figure 2A:
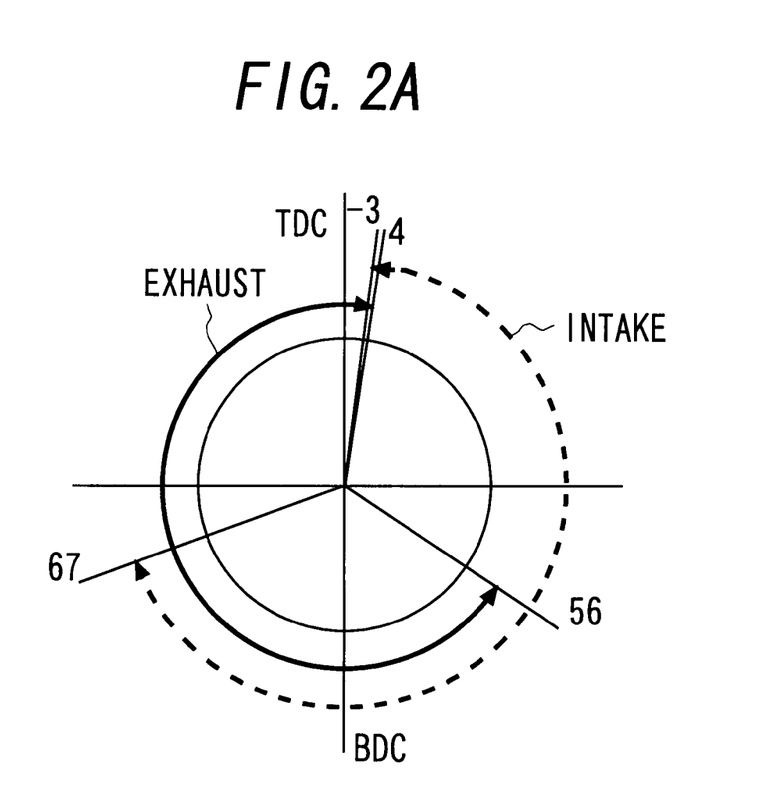
FIG. 2A is a view illustrating typical conventional opening/closing timings of an intake valve and an exhaust valve following warm-up completion.

Here, using FIGS. 2A and 2B, control of the intake valve 12 and the exhaust valve 9 during start-up of the internal combustion engine 1 will be described. FIG. 2A shows typical opening/closing timings of the intake valve 12 and the exhaust valve 9 of the internal combustion engine 1 following warm-up completion. As shown in the drawing, the intake valve 12 is typically opened within a range of −3 degrees relative to TDC and 67 degrees relative to BDC following warm-up completion, for example. Meanwhile, the exhaust valve 9 is opened within a range of 56 degrees relative to BDC and 4 degrees relative to TDC. The opening/closing timings of the intake valve 12 and exhaust valve 9 illustrated here correspond to a reference opening/closing timing according to this embodiment.

Figure 2B:
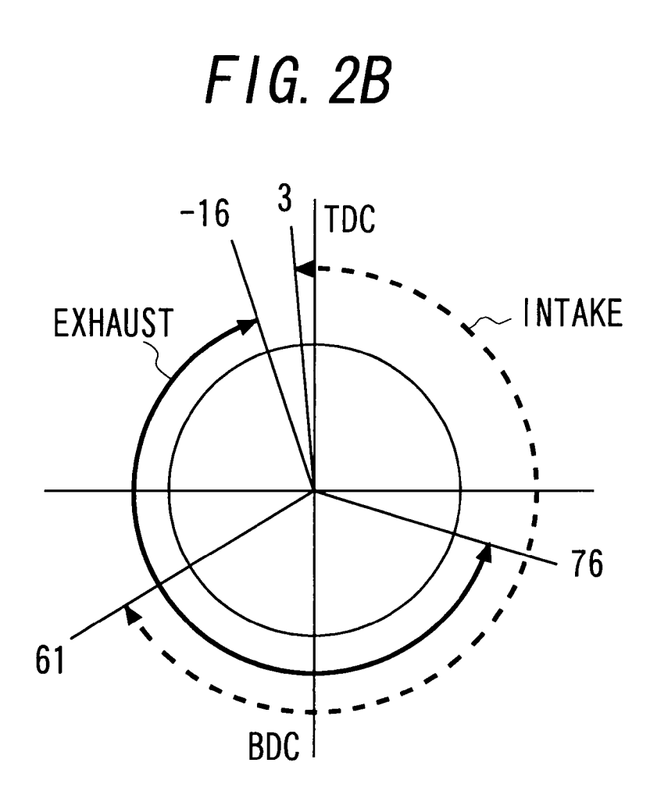
FIG. 2B is a view illustrating typical conventional opening/closing timings of the intake valve and the exhaust valve in a start-up advanced state.

On the other hand, during start-up of the internal combustion engine 1, as shown in FIG. 2B, the opening/closing timings of the intake valve 12 and the exhaust valve 9 are advanced in comparison with the opening/closing timings following warm-up completion (hereafter, this state will be referred to as a "start-up advanced state"). More specifically, in this embodiment, the intake valve 12 is opened within a range of 3 degrees relative to TDC and 61 degrees relative to BDC, for example. Meanwhile, the exhaust valve 9 is opened within a range of 76 degrees relative to BDC and −16 degrees relative to TDC. The opening/closing timings of the intake valve 12 and exhaust valve 9 illustrated here correspond to a start-up opening/closing timing according to this embodiment.

Furthermore, in this embodiment, the opening/closing timings of the intake valve 12 and the exhaust valve 9 are set such that the start-up advanced state described above is realized when the intake side VVT 17 and the exhaust side VVT 16 are in an initial state (i.e. when the intake side VVT 17 and exhaust side VVT 16 have not been activated by a command from tie ECU 20). This initial setting system corresponds to start-up advancing unit according to this embodiment.

In the start-up advanced state, the internal pressure of the cylinder 2 can be raised in the vicinity of TDC, and as a result, higher-pressure compressed gas can be blown back to the intake port 11 side when the intake valve 12 is opened. Hence, atomization of the fuel injected from the fuel injection valve 10 is promoted, enabling an improvement in combustion stability during start-up.

In conventional internal combustion engine control, combustion stability is secured by maintaining the start-up advanced state during start-up of the internal combustion engine, and when a cooling water temperature of the internal combustion engine reaches or exceeds a predetermined temperature, indicating that warm-up is complete, the intake side VVT 17 and exhaust side VVT 16 are used to control the opening/closing timings of the intake valve 12 and the exhaust valve 9 to timings at which appropriate driving performance and fuel efficiency are obtained in accordance with the operating condition. This post-warm-up completion control corresponds to operating condition corresponding control according to this embodiment, and the ECU 20 that issues a command to the intake side VVT 17 and exhaust side VVT 16 at this time corresponds to operating condition corresponding control unit.

Incidentally, it is known that when the start-up advanced state is set during start-up of the internal combustion engine 1, high-temperature combustion gas that has not expanded sufficiently immediately after combustion can be discharged to the exhaust system, and therefore, in addition to improving combustion stability, a secondary effect of increasing the exhaust gas temperature can be obtained.

Hence, in this embodiment, this secondary effect of the start-up advanced state is used to raise the exhaust gas temperature, and as a result, an increase in the temperature of the exhaust passage 6 in the vicinity of the air/fuel ratio sensor 18 is promoted, causing water droplets in the vicinity of the air/fuel ratio sensor 18 to evaporate and disappear at an earlier timing following start-up.

More specifically, in this embodiment, the intake side VVT 17 and exhaust side VVT 16 are not activated even when the cooling water temperature of the internal combustion engine 1 reaches or exceeds the aforementioned predetermined temperature, and the start-up advanced state is maintained until the temperature of the exhaust passage 6 in the vicinity of the air/fuel ratio sensor 18 reaches or exceeds a water droplet disappearing temperature Tw at which the water droplets disappear.

Figure 3:
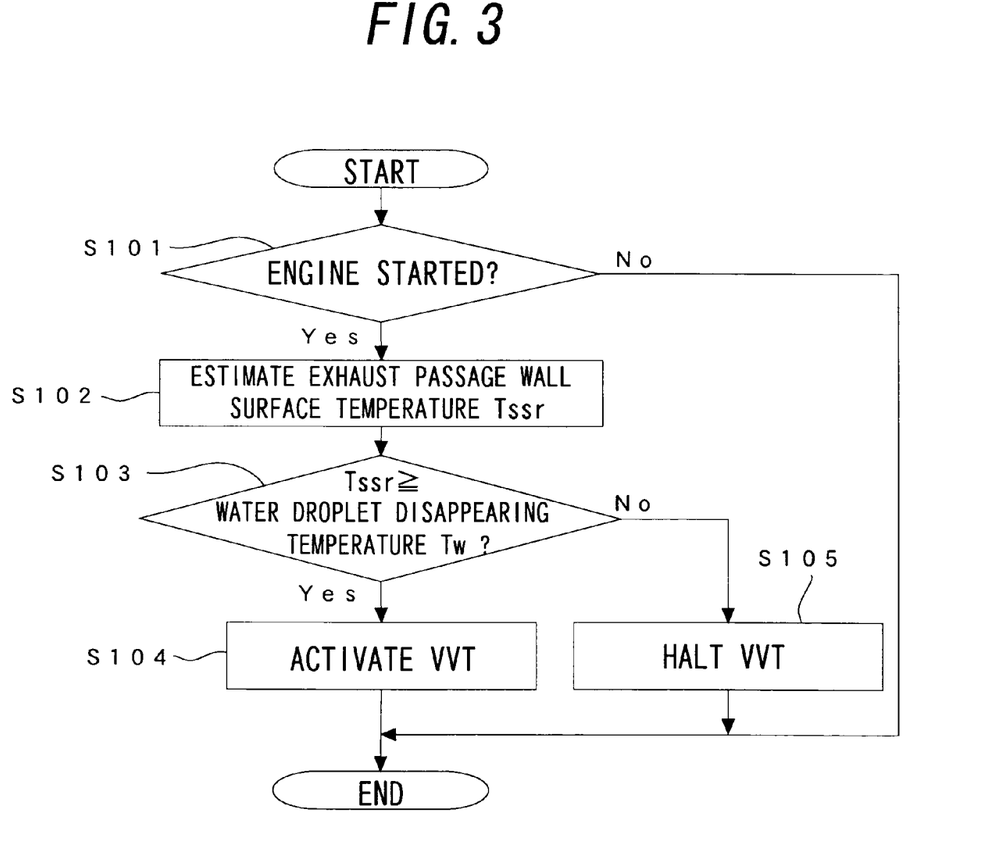
FIG. 3 is a flowchart showing a VVT activation timing control routine according to an embodiment of the present invention.

FIG. 3 shows a flowchart of a VVT activation timing control routine according to this embodiment. This routine is constituted by a program stored in the ROM of the ECU 20, and is executed at predetermined time intervals while power is supplied to the internal combustion engine 1.

Upon execution of the routine, first, in S101, a determination is made as to whether or not the internal combustion engine 1 has been started. When it is determined that the internal combustion engine 1 has not been started, the routine is terminated as is. When it is determined that the internal combustion engine 1 has been started, on the other hand, the routine advances to S102.

In S102, a wall surface temperature Tssr of the exhaust passage 6 in the vicinity of the air/fuel ratio sensor 18 is estimated. More specifically, the wall surface temperature Tssr is estimated from an integrated intake air amount from the beginning of start-up of the internal combustion engine 1 using a predetermined empirical formula. This operation will be described in detail below. When the processing of S102 is complete, the routine advances to S103.

In S103, a determination is made as to whether or not the estimated wall surface temperature Tssr of the exhaust passage 6 is equal to or greater than the water droplet disappearing temperature Tw. When it is determined that the temperature Tssr is equal to or greater than the water droplet disappearing temperature Tw, the routine advances to S104. When it is determined that the temperature Tssr is lower than the water droplet disappearing temperature Tw, on the other hand, the routine advances to S105.

In S104, activation of the intake side VVT 17 and exhaust side VVT 16 is begun, whereby control to modify the opening/closing timings of the intake valve 12 and the exhaust valve 9 in accordance with the operating condition of the internal combustion engine 1 is begun. In S105, activation of the intake side VVT 17 and exhaust side VVT 16 is halted or a halted state is maintained. As a result, the start-up advanced state is continued. When the processing of S104 or S105 is complete, the routine is terminated.

As described above, in this embodiment, the wall surface temperature Tssr of the exhaust passage 6 in the vicinity of the air/fuel ratio sensor 18 is estimated as the temperature in the vicinity of the air/fuel ratio sensor 18 during start-up of the internal combustion engine 1. While the wall surface temperature Tssr remains lower than the water droplet disappearing temperature Tw at which water droplets disappear from the vicinity of the air/fuel ratio sensor 18 in the exhaust passage 6, the start-up advanced state is maintained without starting activation of the intake side VVT 17 and exhaust side VVT 16. When the wall surface temperature Tssr of the exhaust passage 6 reaches or exceeds the water droplet disappearing temperature Tw, on the other hand, activation of the intake side VVT 17 and exhaust side VVT 16 is begun such that the opening/closing timings of the intake valve 12 and the exhaust valve 9 are optimized in accordance with the operating condition of the internal combustion engine 1, leading to improvements in driving performance and fuel efficiency.

Thus, the exhaust gas temperature can be raised more actively during start-up of the internal combustion engine 1 such that energization of the sensor heater of the air/fuel ratio sensor 18 can be started at an earlier timing. As a result, air/fuel ratio feedback control during start-up of the internal combustion engine 1 can be started early, enabling an improvement in emissions.

Note that in the control described above, activation of both the intake side VVT 17 and the exhaust side VVT 16 is not begun while the wall surface temperature Tssr is lower than the water droplet disappearing temperature Tw at which water droplets disappear from the vicinity of the air/fuel ratio sensor 18 in the exhaust passage 6, and therefore both the intake valve 12 and the exhaust valve 9 remain in the start-up advanced state. However, as long as the start-up advanced state is maintained in relation to at least the opening/closing timing of the exhaust valve 9, a sufficient effect is obtained in the present invention, and therefore the control described above may be applied to the exhaust valve 9 alone.

Figure 4:
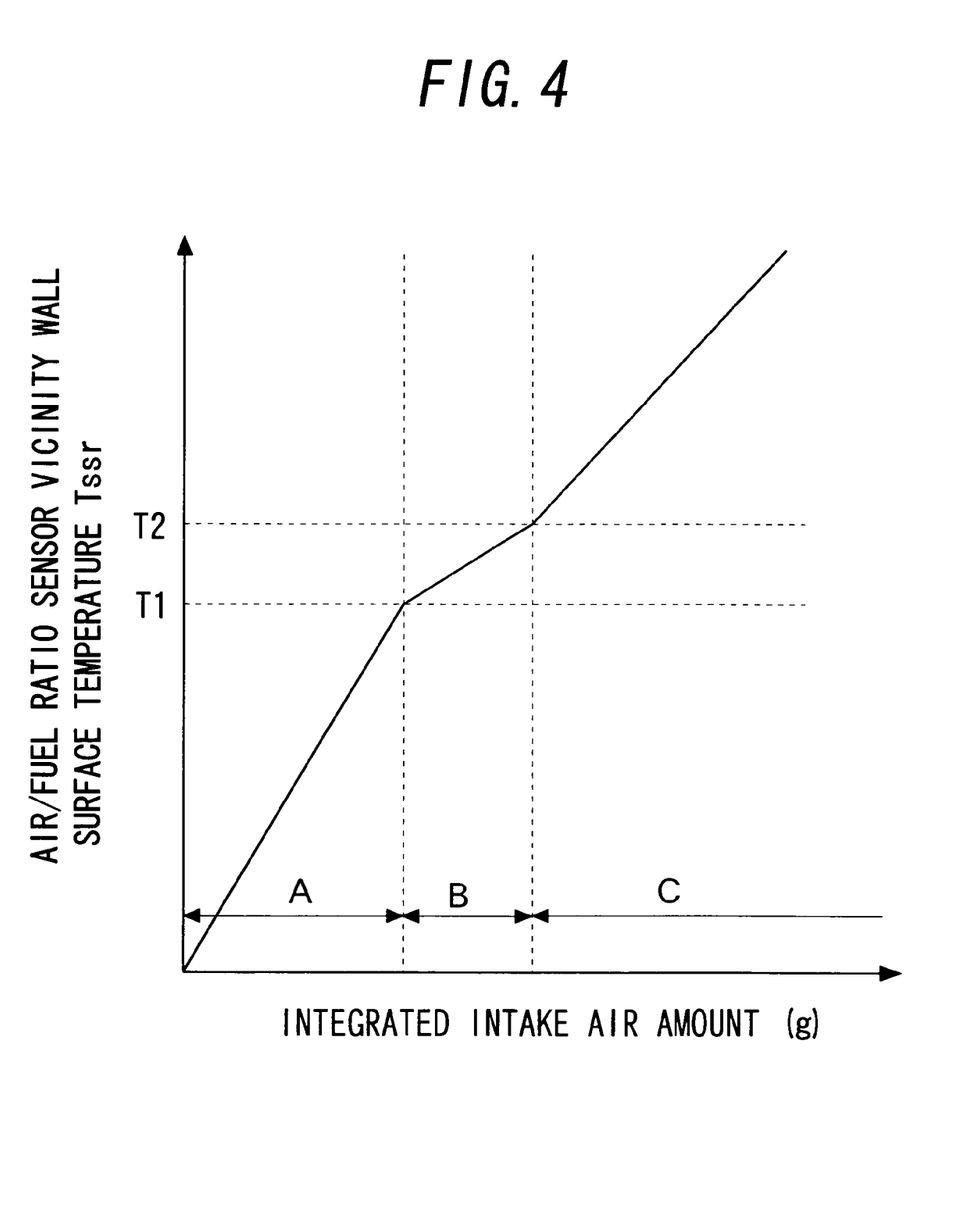
FIG. 4 is a view showing a relationship between an integrated intake air amount and an exhaust passage wall surface temperature estimated value in the vicinity of an air/fuel ratio sensor, according to an embodiment of the present invention.

Next, using FIGS. 4 to 6, a method of estimating the wall surface temperature Tssr of the exhaust passage 6 in the vicinity of the air/fuel ratio sensor 18 in S102 of the VVT activation timing control routine will be described. FIG. 4 is a graph showing a relationship between an integrated intake air amount at the time of start-up and the wall surface temperature Tssr of the exhaust passage 6 in the vicinity of the air/fuel ratio sensor 18 according to this embodiment. This graph is determined through experiment. As shown in FIG. 4, the relationship between the integrated intake air amount and the wall surface temperature Tssr differs among an A region in which the wall surface temperature Tssr is lower than a first threshold temperature T1, a B region in which the wall surface temperature Tssr is equal to or higher than the first threshold temperature T1 and lower than a second threshold temperature T2, and a C region in which the wall surface temperature Tssr is equal to or higher than the second threshold temperature T2.

The respective relationships between the wall surface temperature Tssr and the integrated intake air amount in the A region, the B region, and the C region are expressed by the following equations.

In the A region, $$Tssr = ega1sum \times \Delta A \times kTHW \qquad (1)$$

In the B region, $$Tssr = ega1sum \times \Delta B \times kGAS \times kTHW \qquad (2)$$

In the C region, $$Tssr = ega1sum \times \Delta C \times kTHW \qquad (3)$$

Here, ega1sum is the integrated intake air amount per liter of exhaust gas in the internal combustion engine 1. $\Delta A$, $\Delta B$ and $\Delta C$ are constants of proportionality determined through experiment in relation to the respective regions. kGAS is a correction coefficient used in the B region in particular. kTHW is a correction coefficient determined in accordance with the cooling water temperature during start-up. Further, the first threshold temperature may be set at a dew point temperature (54° C., for example) in the vicinity of the air/fuel ratio sensor 18, and the second threshold temperature may be set at 60° C., for example.

Figure 5A:
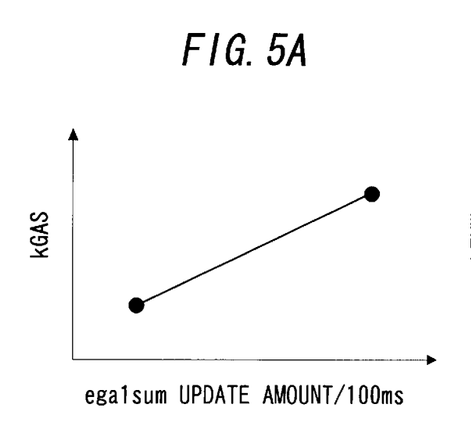
FIG. 5A is a graph showing a relationship between a correction coefficient of an estimation formula for the exhaust passage wall surface temperature and the intake air amount, according to an embodiment of the present invention.
Figure 5B:
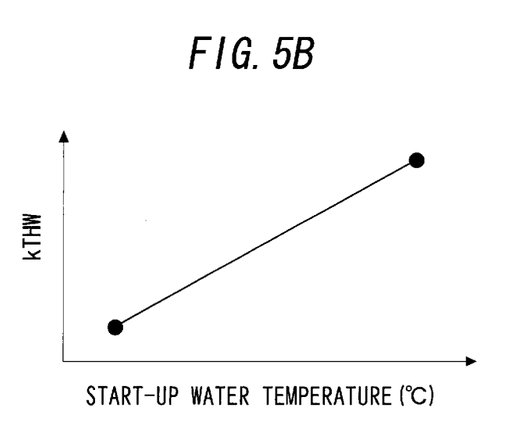
FIG. 5B is a graph showing a relationship between the correction coefficient of the estimation formula for the exhaust passage wall surface temperature and cooling water temperature during start-up, according to an embodiment of the present invention.

Note that FIGS. 5A and 5B show examples of the relationship between the correction coefficient kGAS and the intake air amount (an ega1sum update amount per 100 ms) and the relationship between kTHW and the start-up water temperature, respectively.

Figure 6:
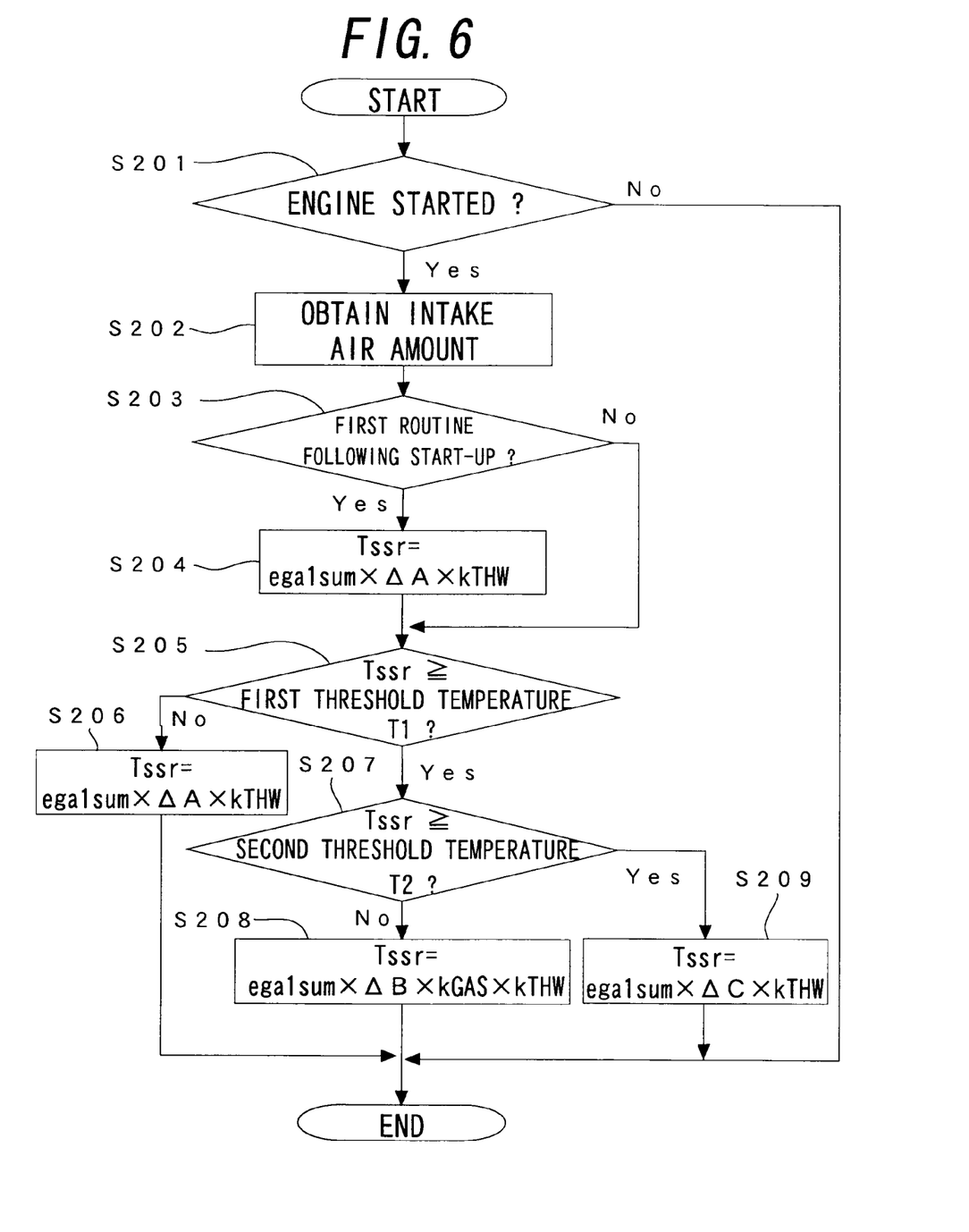
FIG. 6 is a flowchart showing a wall surface temperature estimation routine according to an embodiment of the present invention.

Next, FIG. 6 is a flowchart showing a wall surface temperature estimation routine according to this embodiment. This routine is constituted by a program stored in the ROM of the ECU 20, and is executed at predetermined time intervals while power is supplied to the internal combustion engine 1.

Upon execution of the routine, first, in S201, a determination is made as to whether or not the internal combustion engine 1 has been started. When it is determined that the internal combustion engine 1 has not been started, the routine is terminated as is. When it is determined that the internal combustion engine 1 has been started, on the other hand, the routine advances to S202.

In S202, the intake air amount is obtained. More specifically, the intake air amount is obtained by reading an output signal of the air flow meter 13 to the ECU 20. When the processing of S202 is complete, the routine advances to S203.

In S203, a determination is made as to whether or not the current routine is the first routine following start-up of the internal combustion engine 1. More specifically, for example, a predetermined flag is set at 0 when the internal combustion engine 1 is stopped, and once the first routine has been executed following start-up of the internal combustion engine 1, the flag is set at 1. In this processing, the determination may be made by reading the value of the flag to the ECU 20. When it is determined that the current routine is the first routine following start-up of the internal combustion engine 1, the routine advances to S204. When it is determined that the current routine is not the first routine following start-up, on the other hand, the routine advances to S205.

In S204, the current wall surface temperature Tssr of the exhaust passage 6 is estimated. In this case, the current routine is the first routine following start-up of the internal combustion engine 1, and therefore the wall surface temperature Tssr is estimated using Equation (1) of the region A. When the processing of S204 is complete, the routine advances to S205.

In S205, a determination is made as to whether or not the currently estimated wall surface temperature Tssr of the exhaust passage 6 is equal to or higher than the first threshold temperature T1. When a negative determination is made, the routine advances to S206. When an affirmative determination is made, on the other hand, the routine advances to S207.

In S207, a determination is made as to whether or not the currently estimated wall surface temperature Tssr of the exhaust passage 6 is equal to or higher than the second threshold temperature T2. When a negative determination is made, the routine advances to S208. When an affirmative determination is made, on the other hand, the routine advances to S209.

In the processing of S206, S208 and S209, the value of the wall surface temperature Tssr of the exhaust passage 6 is calculated using Equations (1), (2) and (3), respectively. Note that the value of the integrated intake air amount is obtained by integrating the intake air amount value obtained in S202 during execution of each routine. When the respective processing of S206, S208 and S209 is complete, the routine is terminated.

Hence, in this embodiment, the wall surface temperature Tssr of the exhaust passage 6 in the vicinity of the air/fuel ratio sensor 18 is determined in advance from the integrated intake air amount using a predetermined empirical formula, and therefore the temperature in the vicinity of the air/fuel ratio sensor 18 can be obtained more accurately without using a temperature sensor or the like.

Note that in the embodiment described above, the wall surface temperature Tssr of the exhaust passage 6 is estimated as the temperature in the vicinity of the air/fuel ratio sensor 18, but another temperature, such as the temperature of the exhaust gas itself in the vicinity of the air/fuel ratio sensor 18, may be used as the temperature in the vicinity of the air/fuel ratio sensor 18. Further, a temperature sensor may be used to detect the actual temperature in the vicinity of the air/fuel ratio sensor 18.

In this Embodiment, the electronic control unit (ECU) 20 which executes the wall surface temperature estimation routine corresponds to the temperature obtaining unit.

According to the present invention, spattering of water droplets in an exhaust passage during start-up of an internal combustion engine having an air/fuel ratio sensor that is disposed in the exhaust passage and can detect an air/fuel ratio in a heated state can be terminated early, and therefore a heating timing of the air/fuel ratio sensor can be advanced. As a result, an improvement in emissions during start-up of the internal combustion engine can be achieved.

The invention claimed is:

1. A control device for an internal combustion engine, comprising:
    an air/fuel ratio sensor that is provided in an exhaust passage of said internal combustion engine and can detect an air/fuel ratio of an exhaust gas when activated by being heated;
    start-up advancing unit for setting an opening/closing timing of an exhaust valve during start-up of said internal combustion engine at a start-up opening/closing timing that is on an advanced side of a reference opening/closing timing serving as a reference of the opening/closing timing of said exhaust valve following warm-up completion;
    a variable valve timing mechanism that can modify the opening/closing timing of said exhaust valve;
    operating condition corresponding control unit for performing operating condition corresponding control in which said variable valve timing mechanism is caused to modify the opening/closing timing of said exhaust valve in accordance with an operating condition of said internal combustion engine; and
    temperature obtaining unit for obtaining a temperature of said exhaust passage in the vicinity of said air/fuel ratio sensor, wherein
    when the temperature in the vicinity of said air/fuel ratio sensor obtained by said temperature obtaining unit during start-up of said internal combustion engine is lower than a water droplet disappearing temperature at which water droplets in said exhaust passage disappear, the opening/closing timing of said exhaust valve is held at the start-up opening/closing timing, and
    after the temperature in the vicinity of said air/fuel ratio sensor reaches or exceeds said water droplet disappearing temperature, the operating condition corresponding control unit begins said operating condition corresponding control.

2. The control device for an internal combustion engine according to claim 1, wherein after the temperature in the vicinity of said air/fuel ratio sensor reaches or exceeds said water droplet disappearing temperature, energization of a sensor heater of said air/fuel ratio sensor is begun.

3. The control device for an internal combustion engine according to claim 1 or 2, wherein said temperature obtaining unit estimates the temperature of said exhaust passage in the vicinity of said air/fuel ratio sensor from an integrated intake air amount of said internal combustion engine.

4. The control device for an internal combustion engine according to claim 1 or 2, wherein said temperature obtaining unit estimates the temperature of said exhaust passage in the vicinity of said air/fuel ratio sensor from an integrated intake air amount of said internal combustion engine and a cooling water temperature at the time of start-up of said internal combustion engine.

* * * * *